(12) United States Patent
Wang

(10) Patent No.: US 9,525,756 B2
(45) Date of Patent: Dec. 20, 2016

(54) METHOD AND APPARATUS FOR INVOKING CONTENT OF CONTACT LIST

(75) Inventor: Zhigang Wang, Zhenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 242 days.

(21) Appl. No.: 14/360,751

(22) PCT Filed: Jan. 13, 2012

(86) PCT No.: PCT/CN2012/070347
§ 371 (c)(1),
(2), (4) Date: May 27, 2014

(87) PCT Pub. No.: WO2013/082876
PCT Pub. Date: Jun. 13, 2013

(65) Prior Publication Data
US 2015/0142918 A1  May 21, 2015
US 2016/0323413 A2  Nov. 3, 2016

(30) Foreign Application Priority Data

Dec. 8, 2011  (CN) .......................... 2011 1 0405683

(51) Int. Cl.
*G06F 15/16* (2006.01)
*H04L 29/08* (2006.01)
(Continued)

(52) U.S. Cl.
CPC ............. *H04L 67/32* (2013.01); *G06Q 10/10* (2013.01); *H04L 67/06* (2013.01); *H04M 1/274558* (2013.01)

(58) Field of Classification Search
CPC ......... H04L 67/06; H04L 67/32; G06Q 10/10; H04M 1/274558
See application file for complete search history.

(56) References Cited

U.S. PATENT DOCUMENTS

2007/0130526 A1* 6/2007 Allwright ............ G06Q 10/107
                                                     715/752
2008/0109408 A1* 5/2008 Choi ............... H04M 1/274558
(Continued)

FOREIGN PATENT DOCUMENTS

CN    1992615 A   7/2007
CN    101286118 A  10/2008
(Continued)

OTHER PUBLICATIONS

A method to improve the accuracy of suggested matching words in Chinese Input Method Editor (IME), mailed on Jul. 29, 2010.
(Continued)

*Primary Examiner* — Jonathan Bui
(74) *Attorney, Agent, or Firm* — Oppedahl Patent Law Firm LLC

(57) ABSTRACT

The present disclosure discloses an apparatus for calling content of a contact list, including: a determining unit configured to send a shortcut adding unit a determining result that a shortcut to a contact list can be added in an Input Method Editor IME system; the shortcut adding unit configured to add the shortcut to the contact list in the IME system of a shortcut responding unit when receiving the determining result that the shortcut to the contact list can be added in the IME system sent by the determining unit; and the shortcut responding unit configured to save in the IME system the shortcut to the contact list sent by the shortcut adding unit, and call the contact list according to an operation of selecting the shortcut to the contact list from the IME system. The present disclosure also discloses a method for calling content of a contact list. With the present disclosure the content of a contact list can be called promptly without being limited by a category of content to be acquired or by a device.

4 Claims, 1 Drawing Sheet

(51) Int. Cl.
  *G06Q 10/10* (2012.01)
  *H04M 1/2745* (2006.01)

(56) References Cited

U.S. PATENT DOCUMENTS

| | | | |
|---|---|---|---|
| 2009/0291676 A1* | 11/2009 | Park | H04M 1/72522 455/418 |
| 2009/0322686 A1* | 12/2009 | Jayasinghe | G06F 1/1626 345/173 |
| 2010/0197353 A1* | 8/2010 | Marui | G06F 3/04886 455/566 |
| 2011/0066983 A1* | 3/2011 | Kim | G06F 3/0482 715/835 |
| 2011/0158125 A1* | 6/2011 | Haaparanta | H04M 1/27455 370/254 |
| 2012/0041752 A1* | 2/2012 | Wang | G06F 3/018 704/2 |
| 2012/0064863 A1* | 3/2012 | Dhaliwal | G06Q 10/10 455/414.1 |
| 2012/0135718 A1* | 5/2012 | Amidon | H04W 76/02 455/414.1 |
| 2012/0177191 A1* | 7/2012 | Tam | H04M 1/2472 379/201.03 |

FOREIGN PATENT DOCUMENTS

| | | |
|---|---|---|
| CN | 101299857 A | 11/2008 |
| CN | 101539836 A | 9/2009 |
| CN | 101958954 A | 1/2011 |
| CN | 102098380 A | 6/2011 |
| CN | 102164205 A | 8/2011 |
| CN | 102236421 A | 11/2011 |
| WO | 2011080609 A1 | 7/2011 |
| WO | 2011127640 A1 | 10/2011 |

OTHER PUBLICATIONS

Network-Based Context-Aware Input Method Editor, mailed on Mar. 7, 2015.
12 Tips to use your Japanese IME better nihonshock, mailed on Apr. 1, 2010.
Supplementary European Search Report in European application No. 12856451.5, mailed on Mar. 27, 2015.
International Search Report in international application No. PCT/CN2012/070347, mailed on Sep. 20, 2012.
English Translation of the Written Opinion of the International Search Authority in international application No. PCT/CN2012/070347, mailed on Sep. 20, 2012.

* cited by examiner

METHOD AND APPARATUS FOR INVOKING CONTENT OF CONTACT LIST

TECHNICAL FIELD

The present disclosure relates to the field of mobile communication techniques, and in particular to a method and apparatus for calling content of a contact list.

BACKGROUND

Mobile terminals such as mobile phones have entered an intelligent era, During use of a mobile phone, a short message function thereof is used frequently, and when editing a short message, it is sometimes required to input content of a contact list saved locally in the mobile phone, such as a name, a phone number, and an E-mail address of a recipient. Initially, a method for inputting such content of a contact list is to manually write down contact information in the contact list on a piece of paper, and then input the information on a short message editing interface. Apparently, such a method is too complicated, and is not very accurate or efficient.

To solve this problem, a method for calling content of a contact list is proposed, wherein information on a category of a contact list is taken as an entry in vocabulary of an IME (Input Method Editor) system of a mobile phone. For example, names of all recipients in the contacts are added to the vocabulary; and then content of a contact list corresponding to the name of a selected recipient is called from the IME system. Wherein the method for calling the content of the contact list corresponding to the name of the selected recipient from the IME system is that: a sequence of characters corresponding to the "name of the recipient" is input on an IME interface to obtain a list of candidate entries including the "name of the recipient"; the entry "name of the recipient" is selected, such that the mobile phone acquires names of all recipients saved in the vocabulary, and then a user selects a name of a recipient as needed and acquiring the content of the contact list corresponding to the name of the recipient selected; finally, the user performs a subsequent operation using the content of the contact list according to an actual operation to be performed.

Although efficiency in input by the user may be increased with the above method for calling content of a contact list, key information corresponding to the contact list must be added in the vocabulary in advance before the content of the required contact list can be found by inputting the key information, therefore it is still not fast enough; moreover, in the above method, there are limitations, such as a limitation on the length of the content of the information saved in the vocabulary and a limitation that the content has to be of regular English words; for example, information such as a mailing address or an email address may not be added into the vocabulary since it is relatively long or not of regular English words; in addition, many mobile phones do not support the function of generating a vocabulary entry using content of a contact list as key information, leading to limitation of this method when being applied to a device.

Apparently, with an existing method for calling content of a contact list, content of a contact list can not be called promptly without being limited by a category of content to be acquired or by a device.

SUMMARY

In view of the above, it is desired for the disclosure to provide a method and apparatus for calling content of a contact list, capable of calling content of a contact list promptly without being limited by a category of content to be acquired or by a device.

To this end, a technical solution of the present disclosure is implemented as follows.

The present disclosure provides an apparatus for calling content of a contact list, including: a determining unit, a shortcut adding unit and a shortcut responding unit, wherein the determining unit is configured to send the shortcut adding unit a determining result that a shortcut to a contact list can be added in an Input Method Editor IME system;

the shortcut adding unit is configured to add the shortcut to the contact list in the IME system of the shortcut responding unit when receiving the determining result that the shortcut to the contact list can be added in the IME system sent by the determining unit; and the shortcut responding unit is configured to save in the IME system the shortcut to the contact list sent by the shortcut adding unit, and call the contact list according to an operation of selecting the shortcut to the contact list from the IME system.

The apparatus may further include an interaction displaying unit configured to, when receiving a character inputting instruction, acquire an IME interface from the shortcut responding unit, and when receiving an input sequence of characters, acquire a list of candidate entries corresponding to the input sequence of characters from the shortcut responding unit and send the list of candidate entries to the determining unit;

accordingly, the shortcut responding unit may be further configured to provide the IME interface for the interaction displaying unit; and the determining unit may be further configured to receive the list of candidate entries sent by the interaction displaying unit and determine whether there is an entry "contact list" in the list of candidate entries.

Wherein, the determining unit may be configured to determine whether the shortcut to the contact list can be added in the IME system according to a priority of the entry "contact list" in current vocabulary of the IME system, wherein when the entry "contact list" is of a highest priority, the shortcut to the contact list can be added in the IME system, or when the entry "contact list" is not of a highest priority, the shortcut to the contact list cannot be added in the IME system.

Wherein, the shortcut adding unit may be configured to add an instruction to call the contact list into a property of an icon, take the icon as the shortcut to the contact list, save the shortcut to the contact list into the entry "contact list", and send the entry "contact list" to the shortcut responding unit; and the shortcut responding unit may be configured to receive the entry "contact list" sent by the shortcut adding unit, and update the entry "contact list" in the IME system.

The disclosure further provides a method for calling content of a contact list, including:

when determining that a shortcut to a contact list can be added in an Input Method Editor IME system, adding and saving the shortcut to the contact list in the IME system;

selecting the shortcut to the contact list from the IME system, and calling the contact list.

The method may further include: before the determining that a shortcut to a contact list can be added in an IME system, inputting a sequence of characters on an IME interface, acquiring an entry "contact list", and determining whether the shortcut to the contact list can be added in the IME system.

Wherein, the determining whether the shortcut to the contact list can be added in the IME system may include: determining whether the shortcut to the contact list can be added in the IME system according to a priority of the entry "contact list" in current vocabulary of the IME system, wherein it is determined, when the entry "contact list" is of a highest priority, that the shortcut to the contact list can be added in the IME system, or it is determined, when the entry "contact list" is not of a highest priority, that the shortcut to the contact list cannot be added in the IME system.

Wherein, the adding and saving the shortcut to the contact list may include: adding an instruction to call the contact list into a property of an icon, taking the icon as the shortcut to the contact list, saving the shortcut to the contact list into the entry "contact list", and then updating the entry "contact list" in the IME system.

The method and apparatus for calling content of a contact list provided by the present disclosure have the following advantages and characteristics: a shortcut to a contact list is added in an IME system; when a user needs to call the contact list, the user can call the contact list merely by selecting the shortcut to the contact list in the entry "contact list", thus implementing prompt calling of a contact list.

Further, with the present disclosure, no entry needs to be added in vocabulary of the IME system, and it is merely required to add a shortcut to the contact list in the entry "contact list". Therefore, with the present disclosure, it is possible to remove limitation on the character type of the specific content of an entry to be added in adding an entry in the vocabulary;

In addition, a device may be provided with an apparatus for calling content of a contact list provided by the present disclosure as long as the device has an IME system, thus removing the limitation on the device.

DETAILED DESCRIPTION

According to various embodiments of the present disclosure, when it is determined that a shortcut to a contact list may be added in an IME system, the shortcut to the contact list is added and saved in the IME system; the shortcut to the contact list is selected from the IME system, and the contact list is called.

The present disclosure will be further elaborated below with reference to the accompanying drawings and specific embodiments.

Figure 1:
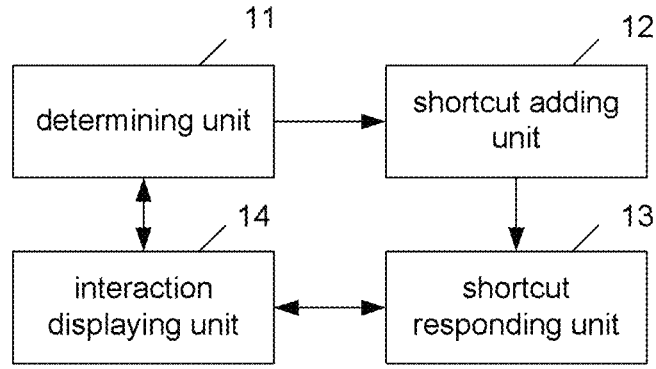
FIG. 1 is a schematic diagram of the structure of an apparatus for calling content of a contact list of the disclosure.

The present disclosure provides an apparatus for calling content of a contact list. As shown in FIG. 1, the apparatus includes: a determining unit 11, a shortcut adding unit 12 and a shortcut responding unit 13, wherein the determining unit 11 is configured to send the shortcut adding unit 12 a determining result that a shortcut to a contact list can be added in an IME system;

the shortcut adding unit 12 is configured to add the shortcut to the contact list in the IME system of the shortcut responding unit 13 when receiving the determining result that the shortcut to the contact list can be added in the IME system sent by the determining unit 11;

the shortcut responding unit 13 is configured to save in the IME system the shortcut to the contact list sent by the shortcut adding unit 12, and call the contact list according to an operation of selecting the shortcut to the contact list from the IME system.

The apparatus for calling content of a contact list also includes an interaction displaying unit 14 configured to, when receiving a character inputting instruction from a user, acquire an IME interface from the shortcut responding unit 13, and when receiving a sequence of characters input by the user, acquire a list of candidate entries corresponding to the input sequence of characters from the shortcut responding unit 13 and send the list of candidate entries to the determining unit 11; accordingly, the shortcut responding unit 13 is also configured to provide the IME interface as well as the list of candidate entries for the interaction displaying unit 14; the determining unit 11 is also configured to receive the list of candidate entries sent by the interaction displaying unit 14 and determine whether there is an entry "contact list" in the list of candidate entries, if there is no contact list, then the operation is stopped, if there is a contact list, then it is determined whether the shortcut to the contact list can be added in the IME system.

The determining unit 11 is specifically configured to determine whether the shortcut to the contact list can be added in the IME system according to a priority of the entry "contact list" in the list of candidate entries, wherein when the entry "contact list" is of a highest priority, the shortcut to the contact list can be added in the IME system, otherwise the shortcut to the contact list cannot be added in the IME system and then the determining unit 11 is configured to stop the operation and instruct, by a notification, the interaction displaying unit 14 to prompt the user that the shortcut to the contact list cannot be added; accordingly, the interaction displaying unit 14 is specifically configured to prompt the user that the shortcut to the contact list cannot be added according to the notification sent by the determining unit 11;

Wherein, the highest priority is determined according to the order of the list of candidate entries currently generated, the first entry in the list of candidate entries is the entry of the highest priority.

The determining unit 11 is also configured to prompt, through the interaction displaying unit 14, the user to check a selection box if the user needs to add the shortcut when it is determined that the shortcut to the contact list can be added in the IME system, and determine whether the shortcut to the contact list needs to be added according to the user's selection returned by the interaction displaying unit 14, if the determining unit 11 learns from the user that the shortcut to the contact list needs to be added, then the determining unit 11 sends the shortcut adding unit 12 the determining result that the shortcut to the contact list can be added in the IME system as well as the entry "contact list"; if the determining unit 11 learns from the user that the shortcut to the contact list needs not to be added, then the determining unit 11 performs no operation; accordingly, the interaction displaying unit 14 is also configured to display the selection box sent by the determining unit 11 for prompting the user to indicate the need to add the shortcut, and feed the user's selection back to the determining unit 11; the shortcut adding unit 12 is specifically configured to receive, from the determining unit 11, the determining result that the shortcut to the contact list can be added in the IME system as well as the entry "contact list";

Wherein the selection box and modes for generating and displaying the selection box are implemented using existing techniques which will not be repeated here.

The shortcut adding unit 12 is specifically configured to select a picture from its local picture library, add an instruction to call the contact list into a property of the picture, and save the selected picture into the shortcut responding unit 13 as a part of the entry "contact list"; accordingly, the shortcut responding unit 13 is specifically configured to receive the entry "contact list" including an icon as the shortcut to the contact list sent by the shortcut adding unit 12, and update the entry "contact list" in its IME system;

Wherein, the icon may be a picture preset by the user, or a picture selected from the picture library by the user during an operation, and the picture may be of a jpg format; the instruction to call the contact list is built-in instruction information of an apparatus for opening the contact list, which information is of existing techniques and will not be repeated here; the instruction to call the contact list is added into the property of the picture using existing techniques and will not be repeated here.

the interaction displaying unit 14 is also configured to send the sequence of characters to the shortcut responding unit 13 after the user inputs the sequence of characters corresponding to the entry "contact list" on the IME interface, acquire the list of candidate entries including the entry "contact list" from the IME system of the shortcut responding unit 13 and display the list of candidate entries; accordingly, the shortcut responding unit 13 is specifically configured to extract the list of candidate entries including the entry "contact list" from locally saved vocabulary of the IME system after receiving the sequence of characters sent by the interaction displaying unit 14, and return the list of candidate entries to the interaction displaying unit 14.

The interaction displaying unit 14 is also configured to determine whether the user selects the shortcut to the contact list in the entry "contact list", if so, then the interaction displaying unit 14 sends information about selection of the shortcut to the contact list to the shortcut responding unit 13, receives and displays the contact list sent by the shortcut responding unit 13, otherwise, the interaction displaying unit 14 responds to the user's operation according to the existing techniques; accordingly, the shortcut responding unit 13 is specifically configured to receive the information about selection of the shortcut to the contact list sent by the interaction displaying unit 14, and extract the contact list from shortcut responding unit 13 itself according to the shortcut and then send the contact list to the interaction displaying unit 14;

Wherein, it is determined whether the user selects the shortcut to the contact list by displaying the entry "contact list" before the user, and determining whether the icon of the shortcut to the contact list is selected by the user.

The interaction displaying unit 14 is also configured to use existing techniques to respond to the user's subsequent editing operation with the contact list, which may includes that: the user looks for a specific contact in the contacts, selects the entry to be input, inserts the entry to be input into a location of editing, and then quits the contacts.

The apparatus for calling content of a contact list may be installed, as a module, in a mobile terminal, such as a mobile phone or a Tablet PC.

Figure 2:
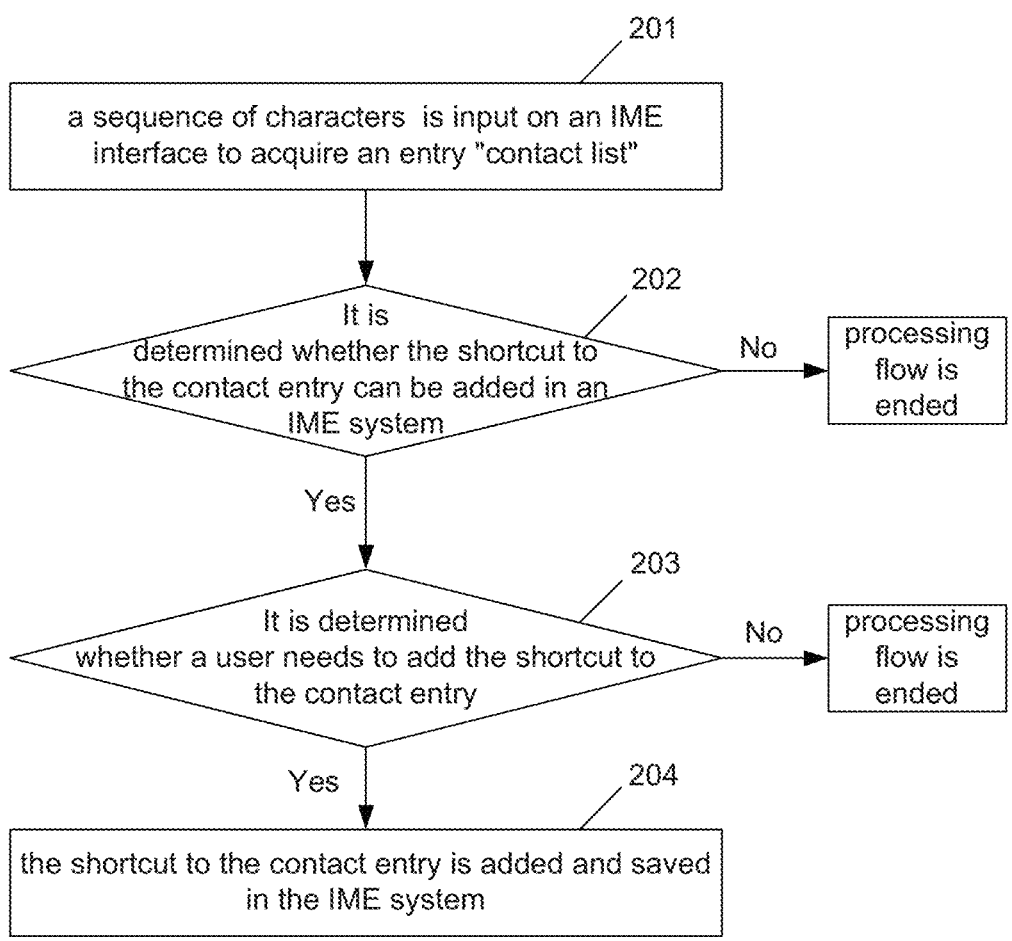
FIG. 2 shows a flow chart of a method for calling content of a contact list of the disclosure.

A method for calling content of a contact list of the present disclosure is shown in FIG. 2, the method including the following steps.

Step 201: a sequence of characters is input on an IME interface to acquire an entry "contact list".

Here, the input sequence of characters differs according to an IME actually used. For example, when a Sogou IME is used, the entry "contacts" may be acquired by inputting a "txl" or a "tongxl".

This step is specifically that: after inputting the sequence of characters on the IME interface, a displayed list of candidate entries is viewed, and it is determined whether there is an entry "contact list" in the list of candidate entries, if there is none, the processing flow is ended; if there is, then step 202 is executed.

Step 202: it is determined whether the shortcut to the contact list can be added in an IME system, if so, step 203 is executed; if not, the processing flow is ended.

Here, the determining whether the shortcut to the contact list can be added in an IME system is that: it is determined whether the shortcut to the contact list can be added in the IME system according to a priority of the entry "contact list" in the list of candidate entries, where when the entry "contact list" is of a highest priority, the shortcut to the contact list can be added in the IME system, otherwise the shortcut to the contact list cannot be added in the IME system.

Step 203: it is determined whether a user needs to add the shortcut to the contact list, if so, then step 204 is executed; otherwise the processing flow is ended.

Here, the user is prompted to check a selection box if the user needs to add the shortcut, and it is determined whether the user needs to add the shortcut to the contact list according to the user's selection; the selection box and modes for generating and displaying the selection box are implemented using existing techniques which will not be repeated here.

Step 204: the shortcut to the contact list is added and saved in the IME system.

Here, an instruction to call the contact list is added into a property of an icon, the icon is taken as the shortcut to the contact list, and the shortcut to the contact list is saved in the entry "contact list", and then the entry "contact list" is updated in the IME system.

After step 204 is completed, the contact list is called when the user selects the shortcut to the contact list in the IME system, specifically including the following steps:

Step a: a sequence of characters is input on an IME interface to acquire an entry "contact list".

Here, the entry "contact list" is an entry added with a shortcut to the contact list, including characters of "contact list" and an icon of the shortcut to the contact list.

Step b: it is determined whether the user selects the shortcut to the contact list, if so, then the contact list is called by using the shortcut to the contact list, the contact list is displayed before the user, and step c is executed; otherwise, a response is made to the user's operation according to existing techniques.

Here, the entry "contact list" is displayed before the user, and it is determined whether the icon of the shortcut to the contact list is selected by the user.

Step c: the user uses the contact list.

Specifically, performing by the user a subsequent editing operation using the contact list by using existing techniques may include that: the user looks for a specific contact in the contacts, selects an entry to be input, inserts the entry to be input into a location under editing, and then quits the contacts.

What described are merely preferred embodiments of the present disclosure, and are not intended to limit the protection scope of the present disclosure.

What is claimed is:

1. A mobile terminal, comprising:
   at least one hardware processor;
   memory in electronic communication with the at least one hardware processor, storing instructions executable by the at least one hardware processor for:
   when determining that a shortcut to a contact list can be added in an Input Method Editor (IME) system, adding the shortcut to the contact list in the IME system, and calling the contact list according to an operation of selecting the shortcut to the contact list from the IME system,
   wherein the adding the shortcut to the contact list in the IME system comprises: adding an instruction to call the contact list into a property of an icon, and updating an entry "contact list" in the IME system with the icon as the shortcut to the contact list; and
   wherein the determining comprises determining whether the shortcut to the contact list can be added in the IME system according to a priority of the entry "contact list" in current vocabulary of the IME system, wherein when the entry "contact list" is of a highest priority, the shortcut to the contact list can be added in the IME system, or when the entry "contact list" is not of a highest priority, the shortcut to the contact list cannot be added in the IME system.

2. The mobile terminal according to claim 1, wherein the memory further stores instructions executable by the at least one hardware processor for: when receiving a character inputting instruction, displaying an IME interface, and when receiving an input sequence of characters on the IME interface, acquiring a list of candidate entries corresponding to the input sequence of characters; and
   determining whether the entry "contact list" is in the list of candidate entries.

3. A method for calling content of a contact list, comprising:
   when determining that a shortcut to a contact list can be added in an-Input Method Editor (IME) system, adding the shortcut to the contact list in the IME system; and
   calling the contact list according to an operation of selecting the shortcut to the contact list from the IME system,
   wherein the adding the shortcut to the contact list in the IME system comprises: adding an instruction to call the contact list into a property of an icon, and updating an entry "contact list" in the IME system with the icon as the shortcut to the contact list; and
   wherein the determining comprises determining whether the shortcut to the contact list can be added in the IME system according to a priority of the entry "contact list" in current vocabulary of the IME system, wherein it is determined, when the entry "contact list" is of a highest priority, that the shortcut to the contact list can be added in the IME system, or it is determined, when the entry "contact list" is not of a highest priority, that the shortcut to the contact list cannot be added in the IME system.

4. The method according to claim 3, further comprising: before the determining that a shortcut to a contact list can be added in an IME system, receiving an input sequence of characters on an IME interface, acquiring the entry "contact list", and determining whether the shortcut to the contact list can be added in the IME system.

* * * * *